Patented July 13, 1926.

1,592,063

UNITED STATES PATENT OFFICE.

WEBSTER E. BYRON BAKER, OF YORK HAVEN, PENNSYLVANIA.

PROCESS OF PREPARING CONCENTRATED SULPHITE CELLULOSE EXTRACT CONTAINING MAGNESIUM COMPOUNDS.

No Drawing. Application filed March 16, 1923. Serial No. 625,620.

There is a demand for an extract containing magnesium compounds, and it is alleged to be superior for use in making roads and for certain other industrial purposes and uses. However, the manufacture of such material presents practical difficulties which will be hereinafter referred to and it is the object of the present invention to overcome those difficulties and to provide an economical and commercially practical process for the manufacture of that material.

The addition of calcined magnesia or magnesium hydroxide or oxide to the light liquors (sulphite waste liquor) prior to concentration, that is at the neutralization stage, leads into some difficulties due to the fact that by that procedure a relatively large amount of magnesium monosulphite remains dissolved in the liquor on account of the relatively high solubility (1.25%) of magnesium sulphite in water. When such liquor is subjected to concentration and the heating associated therewith the magnesium monosulphite enters into a double decomposition reaction with the calcium present in the liquor (as soluble lignosulphonate) which results in the formation and deposition of the much less soluble calcium monosulphite (0.125%) as scale on the tubes and heating surfaces of the evaporation apparatus, resulting in a great diminution of the rate of heat transfer. Therefore, the addition of magnesia as a neutralizer is impracticable and actual operating trials have shown that even a rapid ascending film type of evaporator cannot be operated on such liquor for a period of more than twenty-four to forty-eight hours without the deposition of a very troublesome amount of scale. Furthermore, the resulting product will contain a relatively large amount of sulphur dioxide as sulphite which is injurious to the functioning of the concentrated extract as a road binder and which also exerts a decomposing influence on the organic constituents of the liquor while in process of concentration in the evaporator, causing a greater amount of reversion to acidic condition, and producing a higher amount of acidity in the condensation waters imparting to them a highly corrosive action.

In the present invention these difficulties are overcome by adding milk of lime to the light liquor until the hydrogen ion concentration of the liquor is pH—9. There may also be added at this stage a small quantity or amount of barium or strontium hydroxide solution and this can well be done in the last part of the neutralization procedure and it is done for the purpose of precipitating as completely as possible any sulphuric acid ions present as sulphates and also for the purpose of removing the small amount of the sulphurous acid ions still present as sparingly soluble calcium sulphite. This last procedure is appropriate when it is desirable to remove the ions referred to as completely as possible from the product and when it is essential that scaling be reduced as much as possible. If the purity of the product may be disregarded it is possible to commercially operate without the addition of barium or strontium or both. From a scientific point of view it is possible and slightly advantageous to add only barium or strontium hydroxide to the light liquor, but manifestly that is more expensive than where some milk of lime is employed.

The continuation of the process consists in the filtration and concentration of the light liquor until the resulting liquor contains about fifty per cent of dry matter and has a density of approximately 30 degrees Baumé or thereabout, although I do not limit this operation to any particular resultant concentration. The filtration and concentration of the light liquor may well be effected as described in my application Serial No. 539,284, that is to say, by subjecting it to sedimentation in any of the known sedimentation or thickening apparatus or simply in a tank for a sufficient time to settle the major portion of the larger particles. The supernatant liquor is drawn off and passed through a filter capable of holding the finest precipitates. While I do not limit this procedure to any particular form of filtration apparatus it will be found desirable in most cases to use a high speed centrifugal of the unperforated basket or bowl type, which discharges the clear liquid from the basket or bowl without passing it through the cake, which is precipitated in a compact mass on the side of the bowl or basket while the filtrate flows over the top of the basket or bowl or out at the bottom. The resulting clear liquor is concentrated to about fifty per cent solids content without decomposition. Decomposition is prevented by avoiding and minimizing the exposure of the liquid to high temperature, particularly as the concentration progresses. While any type of apparatus, or method of obtaining these conditions may be employed, it will be found most advantageous and most economical to do this in a multiple effect vacuum evaporator, and of these the rapid film type is most desirable. The evaporator may be constructed of cast iron, with narrow steel tubes. No appreciable increment in iron content will be experienced if the rapid film type is used While in all cases not essential, good results are attained by collecting the liquors prior to neutralization and while still nearly boiling hot and filtering out fibers and solid materials in suspension and then pumping them while still hot through a fine spray nozzle or nozzles into the air under sufficient pressure to produce a mist. When this is done gaseous impurities or components are volatilized and organic compounds are oxidized.

In accordance with the present invention and in order to replace the lime (calcium and other metals, barium and strontium, if present) by magnesium the concentrated liquid extract is treated with the necessary quantity of a concentrated solution of magnesium sulphate. A double decomposition takes place and the magnesium goes into the extract and the calcium (and barium and strontium if present) is separated from the extract as calcium sulphate (barium and strontium as corresponding sulphates) in finely divided form, whereupon the extract is filtered by the use of any type of filtration apparatus and is then ready for use, for example, for making roads as has been stated. The finely divided sulphate precipitate may be washed and dried and is valuable for various uses among which reference may be made to paper manufacture.

While all the lime present in the extract may thus be removed, or at least very nearly all, it is obvious that if desired for any particular use only a portion of the lime may be removed or exchanged for magnesium.

Sulphite cellulose waste liquor or, as it is often called, light liquor is what the process starts with, and it is acid. The extract is what the process makes and it is neutral or slightly basic and contains magnesium compounds.

It will be obvious to those skilled in the art that modifications may be made in details of procedure without departing from the spirit of the invention which, being of a chemical nature, is entitled to the range of equivalents appropriate to that class of inventions and which is not limited otherwise than as the appended claims and the prior art may require.

I claim:

1. The process of preparing concentrated sulphite cellulose extract containing substantially all or a given part of its basic constituents in the form of magnesia which consists in neutralizing low density sulphite waste liquor with a compound of an alkaline earth metal which forms insoluble sulphates and sulphites and concentrating it, treating the resulting concentrated liquid extract with a resulting concentrated solution of magnesium sulphate thereby effecting a double decomposition in which the magnesium goes into the concentrated liquid and the basic constituent of the concentrated liquid separates as sulphate in finely divided form, and separating the latter from the finished concentrated extract, substantially as described.

2. The process of preparing concentrated sulphite cellulose extract containing substantially all or a given part of its basic constituents in the form of magnesia which consists in neutralizing waste liquor at substantially the density at which it is discharged from the digestor with alkaline earth metal oxide or hydroxide until the hydrogen ion concentration of the liquor is pH—9, filtering the basic liquor and concentrating it to make a concentrated solution having its basic constituent other than magnesium and containing comparatively little sulphur dioxide as sulphite, treating the concentrated solution with a concentrated solution of magnesium sulphate thereby effecting a double decompositon in which the magnesium goes into the solution and the basic constituent of the solution precipitates as sulphate in finely divided form, and separating the latter from the finished concentrated extract, substantially as described.

3. The process of preparing concentrated sulphite cellulose extract containing substantially all or a given part of its basic constituents in the form of magnesia which consists in neutralizing low density sulphite waste liquor with calcium oxide or hydroxide and concentrating it to make a concentrated solution, treating the concentrated solution with a concentrated solution of magnesium sulphate thereby effecting a double decomposition in which magnesium goes into the solution and sulphate of calcium in finely divided form precipitates, and separating the sulphate of calcium from the finished extract, substantially as described.

4. The process of preparing concentrated sulphite cellulose extract containing substantially all or a given part of its basic constituents in the form of magnesia which consists in neutralizing low density sulphite waste liquor with oxide or hydroxide of alkaline earth metals excluding magnesium and including alkaline earth metals which form insoluble sulphates and concentrating it to make a concentrated solution containing comparatively little sulphur dioxide as sulphite, treating the concentrated solution with a concentrated solution of magnesium sulphate thereby effecting a double decomposition in which the magnesium goes into the solution and the basic constituents precipitate as sulphates in finely divided form, and separating the latter from the finished extract, substantially as described.

5. In the process of preparing concentrated sulphite cellulose extract containing substantially all or a given part of its basic constituents in the form of magnesia the improved step which consists in treating the low density sulphite waste liquor after neutralization with a compound of an alkaline earth metal which forms insoluble sulphate and for the first time with a magnesium compound, adapted to produce a double decomposition in which the magnesium goes into the finished extract, substantially as described.

WEBSTER E. BYRON BAKER.

sulphite, treating the concentrated solution with a concentrated solution of magnesium sulphate thereby effecting a double decomposition in which the magnesium goes into the solution and the basic constituents precipitate as sulphates in finely divided form, and separating the latter from the finished extract, substantially as described.

5. In the process of preparing concentrated sulphite cellulose extract containing substantially all or a given part of its basic constituents in the form of magnesia the improved step which consists in treating the low density sulphite waste liquor after neutralization with a compound of an alkaline earth metal which forms insoluble sulphate and for the first time with a magnesium compound, adapted to produce a double decomposition in which the magnesium goes into the finished extract, substantially as described.

WEBSTER E. BYRON BAKER.

Certificate of Correction.

It is hereby certified that in Letters Patent No. 1,592,063, granted July 13, 1926, upon the application of Webster E. Byron Baker, of York Haven, Pennsylvania, for an improvement in " Processes of Preparing Concentrated Sulphite Cellulose Extract Containing Magnesium Compounds," an error appears in the printed specification requiring correction as follows: Page 2, line 74, claim 1, strike out the word " resulting "; and that the said Letters Patent should be read with this correction therein that the same may conform to the record of the case in the Patent Office.

Signed and sealed this 7th day of December, A. D. 1926.

[SEAL.]
M. J. MOORE,
*Acting Commissioner of Patents.*

Certificate of Correction.

It is hereby certified that in Letters Patent No. 1,592,063, granted July 13, 1926, upon the application of Webster E. Byron Baker, of York Haven, Pennsylvania, for an improvement in " Processes of Preparing Concentrated Sulphite Cellulose Extract Containing Magnesium Compounds," an error appears in the printed specification requiring correction as follows: Page 2, line 74, claim 1, strike out the word " resulting "; and that the said Letters Patent should be read with this correction therein that the same may conform to the record of the case in the Patent Office.

Signed and sealed this 7th day of December, A. D. 1926.

[SEAL.]                                               M. J. MOORE,
*Acting Commissioner of Patents.*